Patented Mar. 6, 1934

1,950,258

UNITED STATES PATENT OFFICE 1,950,258

METHOD OF FORMING CEMENT RECEPTIVE BACKING FOR RUBBER SOLES

Albert L. Murray, Auburn, Ind.

No Drawing. Application April 25, 1932, Serial No. 607,487

3 Claims. (Cl. 91—68)

The invention relates to improvements in the method for forming cement receptive backing for rubber soles, heels and the like and it utilizes certain features set forth in my previous Patents No. 1,577,349 issued March 16, 1926, for Processes for securing rubber to leather and like materials, No. 1,624,500 issued April 12, 1927, for Composite rubber soles and in my Patent No. 1,630,445 issued May 31, 1927, for Shoe bottoms.

As a result of my said inventions and the economy of the product, soles for shoes attached by these methods are now widely used, the sales being several million pairs per year. In the use and application of the article, specific and different conditions have arisen which have necessitated new methods, based on partial use of the above inventions, combined with certain new steps necessary to produce the desired result in each case.

One such specific condition arises in the application of rubber soles by shoe manufacturers by the usual method of first cementing the rubber sole to the shoe bottom and then sewing or nailing or both sewing and nailing the said parts together. This method of applying a rubber sole is not successful because the rubber cement will not adhere strongly to or penetrate a rubber sole after that part of the sole which is intended to be cemented has developed an air dried and glazed surface. The solvent in the cement cannot dissolve said surface in the short length of time that elapses before the solvent evaporates. The cement therefore separates from the back of the rubber sole and soon peels off or rolls up and in fact it may be rolled off the sole with the thumb when it is applied to such an air dried surface.

Since the cement separates from the air dried surface of a shoe sole the sole when applied to a shoe bottom sooner or later loosens thereon so that the sole is worn from both sides by the flexing movement and soon becomes stretched and bagged and produces a flapping noise when the wearer is walking. The sole eventually tears loose at the line of stretching or nailing long before it has given the wear it would otherwise afford.

As set forth in my prior Patent No. 1,624,500 "raw rubber is especially susceptible to the action of solvents, such as gasoline, ether, carbon tetrachloride and such other well known solvents". Rubber cements as herein referred to are the usual cements made by dissolving raw rubber in a volatile solvent such as one of the above. Consequently, when such a cement is applied to a raw rubber surface the solvent immediately dissolves a portion of the surface and then evaporates so that a film of raw rubber is deposited in the surface from the cement and because part of the surface is in a state of solution the deposited film, upon evaporation of the solvent becomes inseparably united with the article to which it has been applied.

While it is true that the raw rubber sheet vulcanized inseparably to the rubber sole as provided in my previous patents to take care of the condition, its use is largely limited by the fact that the cost of producing the sheet and its protective backing is greater than shoe manufacturers, particularly of the cheaper grades of shoes on which rubber soles are chiefly used, feel justified in paying hence the public is prevented from receiving the benefits of the sole unless a lower cost method can be found.

I have found that, contrary to what has formerly been believed, a very thin film of rubber will have its exposed surface cement receptive even when applied to a vulcanizable body of rubber and subjected to the same treatment as will vulcanize the body and does not vulcanize on such exposed surface. Consequently a film such as will be deposited from a coat of rubber cement may replace the sheet of milled raw rubber used in the above patent and which was necessarily much thicker and more expensive to produce than a thin film deposited from rubber cement.

My invention is, therefore, a simplified process of applying my raw rubber in a thinner form consisting of one or more coats of cement brushed, spread or otherwise applied to my sole rubber stock preferably before vulcanization. The result is that the usual mold glaze on the back of the sole which would make later penetration and strong adhesion of rubber cement impossible is prevented from forming, and the back of my rubber sole, being a thin film of raw rubber, is adapted to inseparably unite with rubber cement used in applying the sole to the shoe. I pack the soles for shipment with the cement sides together, thus keeping the surfaces fresh. This method effects the saving of the entire cost of calendering the raw gum, also of any protective backing such as holland cloth and also reduces the amount of raw rubber required, yet in this method I have retained the essentials that the raw rubber film or sheet deposited by the first cement application, is inseparably attached on one side to the vulcanized sole while the opposite side is maintained respective to homogeneous union with rubber cement.

In the vulcanization of rubber such as is used in shoe soles certain phenomena occur. For instance, after a sheet of shoe sole rubber has been vulcanized it is found that, for a considerable period of time the surface of the rubber is quite soluble in the ordinary solvents used in dissolving raw rubber to form rubber cement. This solubility of the surface persists even after the vulcanized sheet has become cold but finally a glaze is formed on the surface vulcanized sheet and this glazed surface is, for all practical purposes, insoluble in such solvents. That is to say, if a coating containing such a solvent is applied to a glazed surface the solvent will evaporate before solution is effected, such solvents being very volatile. Since the formation of this glazed surface does not occur on unvulcanized or raw rubber it is evident that it is an after effect of vulcanization. Experience has shown that this glazing does not usually occur until more than twenty-four hours have elapsed from the removal of the sheet from the vulcanizer. Accordingly, if a coating of rubber cement be applied to a vulcanized sheet before the after effects of vulcanization are complete, the solvent of the cement will dissolve some of the surface layer of the vulcanized sheet and the raw rubber of the cement will thus inseparably unite with the vulcanized sheet upon the evaporation of the solvent which always takes place. Thus, when hereinafter the after effects of vulcanization are referred to it is to be understood that such after effects are those which practically prevent solution of the surface layer of the vulcanized sheet.

Applying the first coat of rubber cement soon enough after the sole is vulcanized so that it is still sufficiently fresh to be joined inseparably by some of the fumes of vulcanization still remaining or at any time before a glaze has had time to form which cement will not penetrate or cut, are modifications which are still within the scope of my invention, although I obtain best results and practically the same cost by applying the cement before vulcanization.

The fact that my method admits of producing a cement receptive back to rubber soles or any similar articles at such a negligible cost that no extra selling price is necessary, makes this method a practical way of overcoming the difficulty of rubber soles coming loose both in the ordinary shoe manufacture and in repair work. Since the cement union is assisted where the greatest strains come by additional sewing or nailing or both, any thicker film or sheet of raw rubber is not required and the result of the combination of this cement receptive method with standard sewing or nailing is in every way satisfactory.

Separation tests on an inch wide strip of rubber to leather indicate that while the holding power of cement to the ordinary glazed rubber surface is only 2 to 3 lbs. to the inch and only about 4 lbs. where the said surface is buffed, yet where a cement receptive surface is formed by my process before the drying out and glazing of the sole, separation tests run fully 8 lbs. This is amply sufficient to prevent separation in use where the edges of the sole are sewed and nailed and the strength of the union improves with age and the pressure of use.

What I claim is:

1. The method of forming a cement receptive backing on rubber bodies which consists in preparing a body for vulcanization, subjecting the body to vulcanization, and applying a cement of raw rubber and solvent to the surface to be made cement receptive before the formation of a glaze on said surface whereby a film is deposited from the cement and homogeneously and inseparably united to the body on its contact side and on its exposed side remains sufficiently cement receptive to become homogeneous with further applications of rubber cement.

2. The method of forming a cement receptive backing on rubber bodies which consists in preparing an unvulcanized but vulcanizable rubber body, subjecting the body to a vulcanization heat, and applying a cement of raw rubber and solvent to the body prior to the cooling of the body whereby a film is deposited on the body and is left unvulcanized and cement receptive on its exposed side and with the contact side of the film inseparably united to the body.

3. The method of forming a cement receptive backing on rubber bodies which consists in preparing an unvulcanized but vulcanizable rubber body, applying a cement of raw rubber and solvent thereto, subjecting the body to a vulcanization heat, applying a cement of raw rubber and solvent thereto prior to the cooling of the body whereby a film of raw rubber is left unvulcanized and cement receptive on its exposed side and with the contact side of the film inseparably united to the body, and applying a second film of rubber cement to the first film after the cooling of the body and first film.

ALBERT L. MURRAY.